United States Patent [19]

Neuhold

[11] 4,223,852
[45] Sep. 23, 1980

[54] ROLL FILM CARTRIDGE
[75] Inventor: Arnold Neuhold, Farchant, Fed. Rep. of Germany
[73] Assignee: Geimuplast Peter Mundt GmbH & Co. KG, Farchant, Fed. Rep. of Germany
[21] Appl. No.: 9,173
[22] Filed: Feb. 2, 1979
[30] Foreign Application Priority Data
  Feb. 6, 1978 [DE] Fed. Rep. of Germany ....... 2804985
[51] Int. Cl.³ .............................................. G03B 17/26
[52] U.S. Cl. ................................................. 242/71.1
[58] Field of Search ................ 242/71.1, 71.2, 71, 242/71.7, 197–200, 55.53; 352/72, 75, 78 R; 221/69–71; 206/387, 389, 408, 409

[56] References Cited
U.S. PATENT DOCUMENTS

| | | | |
|---|---|---|---|
| 3,043,534 | 7/1962 | Hejnochowicz | 242/71.1 |
| 3,104,846 | 9/1963 | Ringle | 242/71.1 |
| 3,690,451 | 9/1972 | Nerwin | 242/71.2 X |
| 4,093,142 | 6/1978 | Mindell | 242/197 X |

FOREIGN PATENT DOCUMENTS
2612352 10/1977 Fed. Rep. of Germany.

*Primary Examiner*—John M. Jillions
*Attorney, Agent, or Firm*—Fleit & Jacobson

[57] ABSTRACT

The cartridge is made of plastic material and comprises a shell having an exit slot and end covers mounted at the ends of said shell. The cartridge consists of three substantially semicylindrical members, which by means of two hinges are connected to each other so that two semicylindrical members when folded together constitute a shell which encloses the roll of film and the third semicylindrical member covers said shell and defines a film passage in the shape of an arc of a circle, and the exit slot of the cartridge, and the two outer semicylindrical members are interconnected.

5 Claims, 2 Drawing Figures

4,223,852

ROLL FILM CARTRIDGE

BACKGROUND OF THE INVENTION

This invention relates to a roll film cartridge which is made of plastic material and comprises a shell having an exit slot and end covers mounted at the ends of said shell. Such roll film cartridge is known from Opened German Specification No. 26 12 352 and comprises a shell which at each end facing an end cover is formed with a rib, which is receivable in a groove of the end cover to form a labyrinth gland. Adjacent to the exit slot, the groove is interrupted by a spacer for the exit slot. That edge of the cover which defines the groove on the outside thereof is lower than the rib of the shell. It is apparent that the known roll film cartridge consists of two parts, namely, the shell and the two end covers, which are adapted to be mounted on the ends of the shell.

Roll film cartridges which consist of two parts and are made from sheet metal or plastic material are known too. In both cases the exit slot of the cartridge must be lined with velvet in order to ensure the necessary lighttightness. The application of the velvet ribbon requires an additional operation. The application of a velvet ribbon in order to ensure the required lighttightness involves the further disadvantage that the velvet retains particles of dust, which may scratch the image area of the film. Finally, these known roll film cartridges involve the problem that, the narrower the exit slot of the cartridge the better is its lighttightness. But cartridges having tighter exit slots involve also a higher tension of the film.

Other known cartridges are lighttight without requiring velvet because the film is guided in a curved passage from the roll to the outside of the cartridge. These velvet-free cartridges have not been successful on the market because particularly when they were made of sheet metal it was difficult to avoid excessive costs in providing a film passage having the close tolerances which are required. In a known velvet-free cartridge of plastic, an additional core which defines the film passage is required and also adds to the manufacturing costs. All velvetless cartridges render the loading of film into the cartridges much more difficult so that they are not suitable for commercial use. Such cartridges have had a limited market only as so-called re-loadable cartridges for use by amateurs.

It is an object of the invention so to improve the known roll film cartridge of plastic material that it can be made in a simpler manner and preferably in one piece.

SUMMARY OF THE INVENTION

In a roll film cartridge of the kind described hereinbefore, according to the invention, the cartridge consists of three substantially semicylindrical members, which by means of two hinges are connected to each other so that two semicylindrical members when folded together constitute a shell which encloses the roll of film and the third semicylindrical member covers said shell and defines a film passage in the shape of an arc of a circle, and the exit slot of the cartridge. The roll film cartridge according to the invention has the advantage that it can be made in one piece, that there is no need for applying a velvet ribbon, and that it nevertheless has the required lighttightness but involves only a low film tension.

If the roll film cartridge according to the invention is provided with a film spool, the end covers have circular apertures for guiding the film spool. Such cartridge also has all advantages which are afforded by the invention.

In a preferred embodiment of the invention, raised edge portions are provided on the outside surface of the innermost semicylindrical member and on the inside surface of the semicylindrical member which can be folded over said innermost member and when said raised edge portions are in register they define narrow guideways for the edge portions of the film. This embodiment affords the advantage that the image area is not contacted by the guideways.

DESCRIPTION OF DRAWINGS

An embodiment of the invention will be described by way of example in the following description with reference to the accompanying drawing, in which.

DESCRIPTION OF PREFERRED EMBODIMENT

Figure 1:
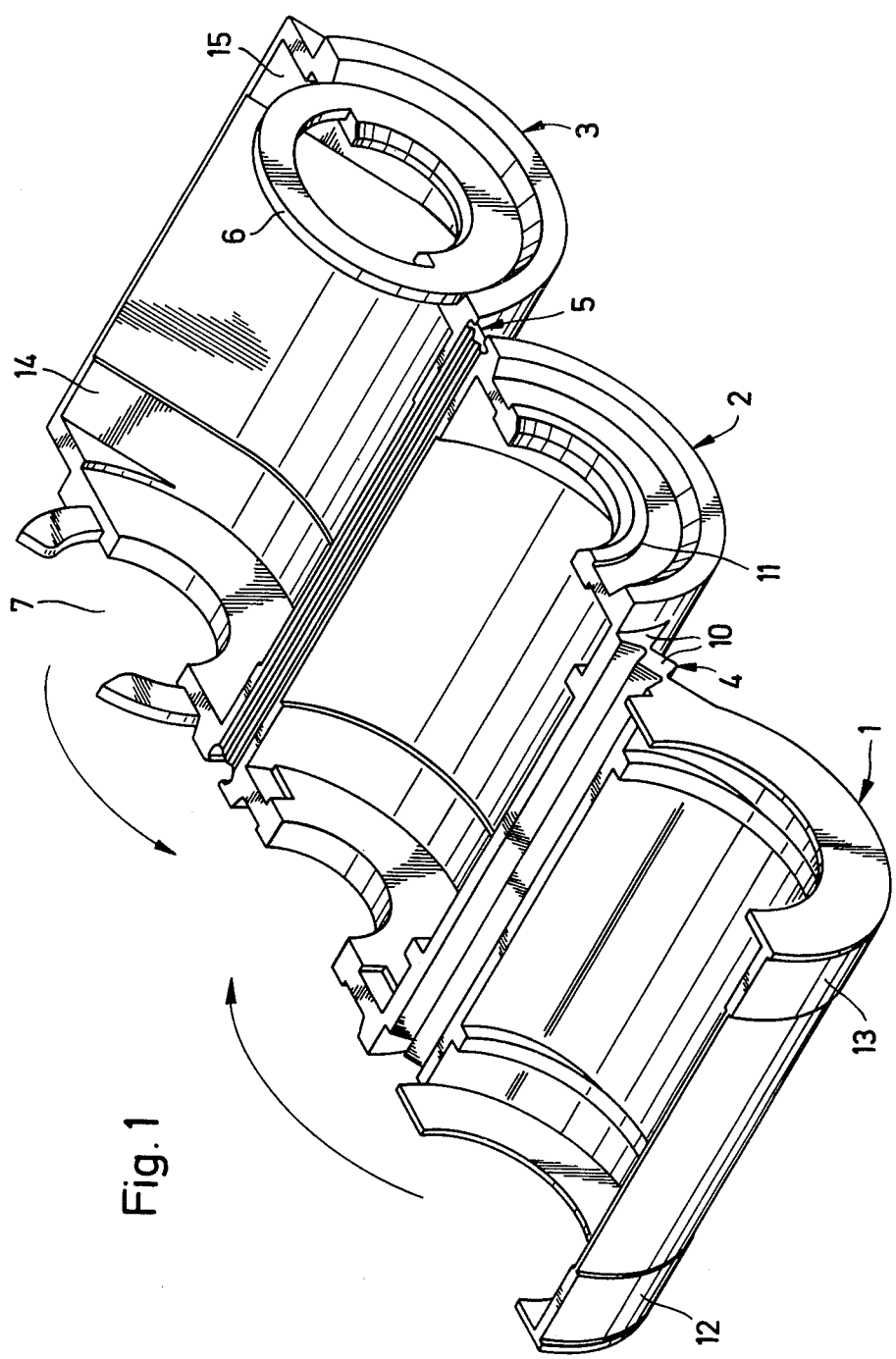
FIG. 1 is a perspective view showing the roll film cartridge according to the invention as manufactured and FIG. 2 is a sectional view showing a roll film cartridge according to the invention ready for use.
Figure 2:
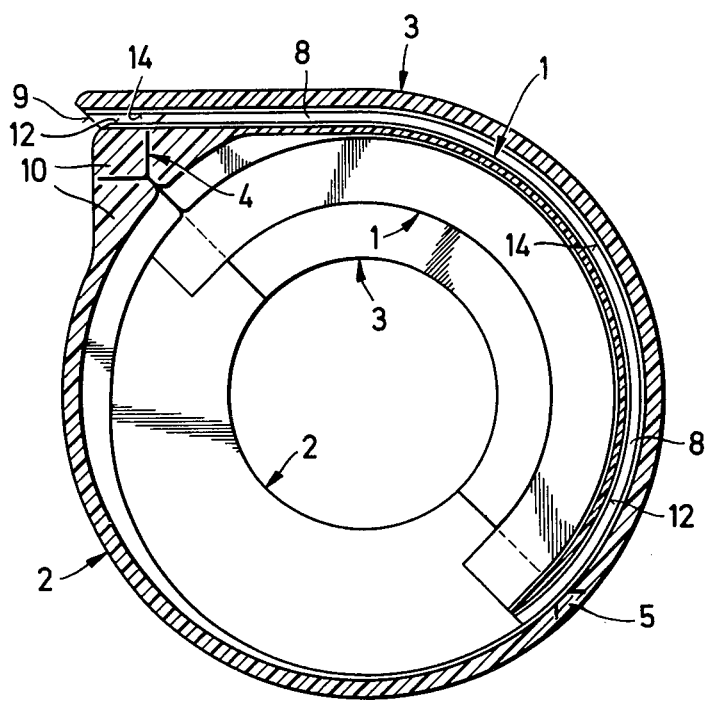

The cartridge consists of three substantially semicylindrical members 1, 2, 3, which are interconnected by two hinges 4, 5. One end cover portion of the outer semicylindrical member 3 consists of a complete circular ring 6. The end cover disposed at the other end is formed with a slotlike passage 7 for the coupling head of a film spool. The hinges 4, 5 consist of double hinges. The semicylindrical members 1 and 2 can be folded together to form a shell which encloses the roll of film. When the semicylindrical member 1 has been in against member 2, the outer semicylindrical member 3 is folded over the member 1 to define the film passage 8, which is apparent from FIG. 2 and has the shape of an arc of a circle, and the exit slot 9. As is apparent from FIG. 2 the exit slot 9 is defined by the outer semicylindrical member 3 and elements 10 provided on the back of the double hinge 4. To interconnect the semicylindrical members, the end cover 6 of the outer semicylindrical member 3 having the configuration of a closed ring can be snap-fitted on a mating inner ring 11 of the intermediate semicylindrical member 2. Raised edge portions 12, 13 are provided on the inside surface of the semicylindrical member 3, which can be folded over the member 1. When these raised edge portions 12, 13, 14, 15 are in register, they define narrow guideways for the edge portions of the film.

What is claimed is:

1. A roll film cartridge comprising a central substantially semicylindrical member, a pair of outer substantially semicylindrical members, hinge means connecting said outer members to opposite longitudinal edges of said central member respectively, and means for interconnecting said central member and one of said outer members together to form a substantially cylindrial shell for enclosing a roll film and for connecting the other of said outer members around said shell to form a cover defining in conjunction with said shell an arcuate film passage and a film exit slot.

2. A cartridge according to claim 1, including means defining end covers with circular apertures for guiding a film spool.

3. A cartridge according to claim 2, characterized in that said other outer member has a cover at one end comprising a circular ring, which is adapted to be snap-fitted on a mating inner ring of said central member, and said other outer member has a further cover at the other end in the form of a part circular ring with an open portion.

4. A cartridge according to claim 1, 2 or 3 characterized in that the hinges consist of double hinge means and one double hinge is provided on its back with elements which together with said other outer semicylindrical member define the exit slot of the cartridge.

5. A cartridge according to claim 1 including raised edge portions on an outside surface of said one outer semicylindrical member and on an inside surface of said other outer semicylindrical member to define guideways for edge portions of a film.

* * * * *